US009603120B2

(12) United States Patent
Eriksson et al.

(10) Patent No.: US 9,603,120 B2
(45) Date of Patent: Mar. 21, 2017

(54) PAGING CANCEL PROCEDURE IN A TELECOMMUNICATIONS SYSTEM

(71) Applicant: Telefonaktiebolaget L M Ericsson (publ), Stockholm (SE)

(72) Inventors: Erik Eriksson, Linköping (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/650,334

(22) PCT Filed: Dec. 12, 2012

(86) PCT No.: PCT/EP2012/075217
§ 371 (c)(1),
(2) Date: Jun. 8, 2015

(87) PCT Pub. No.: WO2014/090294
PCT Pub. Date: Jun. 19, 2014

(65) Prior Publication Data
US 2015/0304986 A1 Oct. 22, 2015

(51) Int. Cl.
*H04W 68/00* (2009.01)
*H04W 92/04* (2009.01)
(52) U.S. Cl.
CPC ......... *H04W 68/005* (2013.01); *H04W 68/00* (2013.01); *H04W 92/045* (2013.01)
(58) Field of Classification Search
CPC . H04W 68/005; H04W 68/00; H04W 92/045; H04W 68/02
See application file for complete search history.

(56) References Cited

U.S. PATENT DOCUMENTS

2009/0017845 A1* 1/2009 Wu .................. H04W 68/02
455/458

FOREIGN PATENT DOCUMENTS

EP 2439985 A1 4/2012
WO 2011100497 A1 8/2011

OTHER PUBLICATIONS

3GPP, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11)", 3GPP TS 29.274 V11.2.0, Mar. 2012, 1-214.

(Continued)

*Primary Examiner* — Chuong A Ngo
(74) *Attorney, Agent, or Firm* — Murphy, Bilak & Homiller, PLLC

(57) ABSTRACT

Disclosed is a paging control method in a telecommunications system where devices are paged by paging requests from base stations, the base stations being controlled by paging control messages from a network node. The method involves detecting (310), in the network node, a need to initiate paging of a device. Then, a set of candidate base stations in an area of the telecommunications system is determined (320) by the network node. The candidate base stations are potentially capable of reaching the device in the area by sending paging requests at respective paging occasions. The network node selectively controls (330) paging control messages intended for the set of candidate base stations depending on detection of a paging response made by the device via one of the base stations in the set of candidate base stations, so as to prevent paging requests from base stations, in the set of candidate base stations, which have not yet sent any paging requests to the device.

15 Claims, 6 Drawing Sheets

(56) References Cited

OTHER PUBLICATIONS

3GPP, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11)", 3GPP TS 29.274 V11.4.0, Sep. 2012, 1-219.

3GPP, "3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.5.0, Mar. 2012, 1-302.

3GPP, "3rd Generation Partnership Project; Technical Specification Group Radio Access Network; Evolved Universal Terrestrial Radio Access Network (E-UTRAN); S1 Application Protocol (S1AP) (Release 10)", 3GPP TS 36.413 V10.5.0, Mar. 2012, 1-255.

Unknown, Author, "Introduction of paging cancel procedure", 3GPP TSG-WG3 Meeting #65, R3-091789, Motorola, Shenzhen, China, Aug. 24-28, 2009, 1-4.

Unknown, Author, "Introduction of paging cancel procedure", 3GPP TSG-WG3 Meeting #62, R3-082985, Motorola, Prague, Czech Republic, Nov. 10-14, 2008, 1-48.

Unknown, Author, "Paging load reduction in asynchronous cells", 3GPP TSG-RAN-WG3 Meeting #65, R3-091788, Motorola, Shenzhen, China, Aug. 24-28, 2009, 1-8.

\* cited by examiner

PAGING CANCEL PROCEDURE IN A TELECOMMUNICATIONS SYSTEM

TECHNICAL FIELD

The present disclosure relates to mobile telecommunication, and in particular to a paging control method in a telecommunications system, where devices are paged by paging requests from base stations, and the base stations are controlled by paging control messages from a network node. The present disclosure also relates to a corresponding computer readable storage medium and network node.

BACKGROUND

Mobile telecommunications systems based on one or more cellular networks are known in many different forms. A common aspect of older 2G systems (such as GSM—Global System for Mobile Communications) as well as more recent 3G (e.g. UMTS—Universal Mobile Telecommunications System) and 4G (e.g. EPS/LTE—Evolved Packet System/Long Term Evolution) systems is the need for paging of terminal devices in the system. Such terminal devices are for instance referred to as mobile stations (MS) in GSM and user equipment (UE) in UMTS and LTE, and are typically used by human users in a truly mobile manner.

Also, terminal devices are known which typically do not involve human users and which mostly have a more stationary installation. Examples are terminal devices for MTC (Machine Type Communication) or M2M (Machine To Machine) communication in EPS/LTE or UMTS. Such terminal devices are referred to as machine devices (MD).

For the purpose of this document, the term "wireless device" or just "device" will be used as a common reference to a terminal device, not limited to any particular type, which accesses a cellular network over a wireless interface. As specific examples of such devices, UEs and MDs for an EPS/LTE system will primarily be used without any prejudicial limiting effect. FIG. 1 illustrates an EPS/LTE compliant telecommunications system, which will be described in more detail in the Detailed Description section of this document, and a terminal device in the form of a UE used therein.

The purpose of the paging concept is to reach an idle UE to deliver data (signaling data or user data) in the downlink direction from the network to the UE. In order to reach the UE, the page is transmitted in the entire area where the UE may be located (according to the knowledge of the network). When moving between such areas, the UE has to inform the network, so that the network knows in which area to page the UE, when needed. Such an area typically consists of multiple cells (but less than the entire network area). This principle is based on a trade-off between the signaling (radio) resources used for paging and the signaling (radio) resources used when UEs report their location (i.e. area) to the network. In EPS/LTE, a registration area is defined as a set of Tracking Areas (TAs). Each attached UE has a list of Tracking Area Identities (TAIs), representing the UE's current registration area (i.e. set of TAs), which is stored in the UE and the MME (Mobility Management Entity) in which the UE is currently registered.

To be reachable for paging an idle UE has to monitor a certain repetitive downlink signaling channel to check for paging indications directed towards it. In EPS/LTE, this consists of monitoring the PDCCH (Physical Downlink Control Channel) for downlink resource assignments addressed to a paging RNTI (P-RNTI, Paging Radio Network Temporary Identifier). The P-RNTI is shared among many UEs (potentially all, as is the case in LTE). When detecting such a paging indication, the UE has to receive a Paging RRC (Radio Resource Control) message, which is transmitted on the downlink transmission resources on the PDSCH (Physical Downlink Shared Channel) that were assigned by the paging indication on the PDCCH. This Paging RRC message contains the identity or identities of the UE(s) that the paging concerns and which is/are thus requested to contact the network. When finding its identity in a Paging RRC message, the UE initiates a random access procedure towards the eNB (E-UTRAN (Evolved Universal Terrestrial Radio Access Network) Node B), establishes an RRC connection with the eNB and sends a Service Request NAS (Non Access Stratum) message to the MME (via the eNB).

As an energy saving feature, primarily to promote long battery lifetimes, a paging DRX (Discontinuous Reception) mechanism is used. This allows the UE to spend most of its time in a more energy-efficient mode, e.g. a "sleep mode", and activate its receiver for the purpose of monitoring the PDCCH for paging indications only on specific occasions (also denoted active periods). The UE and the eNB have a common understanding of which these occasions are, so that the eNB can send paging indications concerning the UE when the UE listens. A paging DRX cycle is thus divided into a sleep period and an active period, wherein the active period is essentially equal to a potential paging occasion.

Currently, the paging DRX cycle is defined by the paging configuration parameters T and nB together with IMSI modulo 1024. These parameters are input to an algorithm which points out the frames (within each SFN (System Frame Number) cycle) and subframes (within these frames) in which the UE may be paged (i.e. the paging occasions).

Details of the algorithm for calculating the frames and subframes where pages may occur, i.e. the paging occasions, according to the current LTE standard is specified in chapter 7 of 3GPP TS 29.274 V11.2.0, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11)", March 2012. [1]

The T parameter is defined as the minimum of the defaultPagingCycle IE (Information Element), which is broadcasted in SIB2 (System Information Block Type 2) of the system information, and a possible pre-configured UE-specific DRX cycle length. If a UE-specific DRX cycle is used, the UE sends it to the MME in the Attach Request NAS message, when attaching to the network, and/or in a Tracking Area Update Request NAS message. The nB parameter is broadcasted together with the defaultPagingCycle IE in SIB2 of the system information. The IMSI (International Mobile Subscriber Identity) of the UE is stored in the USIM (Universal Subscriber Identity Module) on the UICC (Universal Integrated Circuit Card) in the UE as well as in the MME in which the UE is registered.

FIG. 2 gives a schematic overview of the different steps performed when a UE 250 is paged in an EPS/LTE system 200, like the one illustrated in the aforementioned FIG. 1. In EPS/LTE, paging is initiated from the core network, typically triggered by arrival of downlink user data through a PGW (PDN GW; Packet Data Network Gateway) 210. The user data to be delivered is buffered in a SGW (Serving Gateway) 220, which sends a Downlink Data Notification GTPv2-C (GPRS (General packet radio service) Tunnelling Protocol version 2) message 212 to an MME 230. For details of this message, see reference [1] above.

The MME 230 checks which eNBs 240 have cells belonging to any of the TAs whose TAIs are included in the UE's current TAI list, and then sends a paging control message 232 in the form of a PAGING S1AP (S1 Application Protocol) message across the S1 interface 270 to each of these eNBs, requesting the respective eNB 240 to page the UE in all cells belonging to any of the concerned TAs, i.e. all cells having a TAI that is included in the UE's list of TAIs. The PAGING S1AP message includes IMSI modulo 1024 in the UE Identity Index Value IE, the UE's list of TAIs in the List of TAIs IE and a possible UE-specific DRX cycle length in the Paging DRX IE. Details of the PAGING S1AP message are found in 3GPP TS 36.413 V10.5.0, "3rd Generation Partnership Project; Technical Specification Group Radio Access Network; Evolved Universal Terrestrial Radio Access Network (E-UTRAN); S1 Application Protocol (S1AP) (Release 10)", March 2012. [2]

Upon receiving the paging control message PAGING S1AP 232 from the MME 230, the eNB 240 calculates the applicable paging occasions and awaits the next paging occasion. Then, at the next paging occasion, the eNB 240 sends a paging request on the PDSCH in the form of a Paging RRC message 244, indicated by a downlink resource assignment addressed to a paging RNTI (P-RNTI) on the PDCCH as seen at 242, to the UE 250 in the subframe corresponding to the paging occasion. (It is to be noticed that even though 242 and 244 have been indicated as separate events in the schematic illustration in FIG. 2, they take place concurrently in the same subframe.) The eNB 240 does this for each of its cells that take part in the paging procedure. Details of the Paging RRC message are found in 3GPP TS 36.331 V10.5.0, "3rd Generation Partnership Project; Technical Specification Group Radio Access Network; Evolved Universal Terrestrial Radio Access (E-UTRA); Radio Resource Control (RRC); Protocol specification (Release 10)", March 2012.

As already mentioned above, when the UE 250 finds its identity in the Paging RRC message 244, the UE 250 initiates a random access procedure towards the eNB 240, establishes an RRC connection with the eNB 240 and sends a paging response 246 in the form of a Service Request NAS message to the MME 230.

Since paging is performed in multiple cells, but the UE 250 only listens to transmissions in a single cell, the paging procedure inevitably results in a waste of transmission resources, and thus also unnecessarily increased interference. Many paging requests (paging indications 242 and Paging RRC messages 244) as well as many paging control messages (PAGING S1AP messages 232) will be redundant.

A currently popular vision of the future development of the communication in cellular networks comprises huge numbers of small autonomous devices, which typically and more or less infrequently (e.g. once per week to once per minute) transmit and receive only small amounts of data (or are polled for data). These devices are assumed not to be associated with humans, but are rather sensors or actuators of different kinds, which communicate with application servers (which configure the devices and receive data from them) within or outside the cellular network. As mentioned above, this type of communication is often referred to as M2M or MTC communication, and the devices are referred to as MDs (or M2M or MTC devices). With the nature of MDs and their assumed typical uses follow that they will often have to be very energy-efficient, since external power supplies will often not be available. Instead they have to sustain on energy harvesting or batteries, and it would not be practically or economically feasible to frequently replace or recharge their batteries.

One way of achieving low energy consumption in MDs is to use long (extended) paging DRX cycles. This will allow the MDs to spend the vast majority of their idle mode time in an energy-efficient sleep mode with the wireless receiver turned off. When extended paging DRX cycles are introduced, which potentially are much longer than current paging DRX cycles, they will span across multiple SFN cycles (e.g. N cycles). To facilitate that this works smoothly in combination with the current relaxed SFN cycle synchronization (i.e. the lack of synchronization requirement between cells), extended paging DRX cycles are likely to be defined as multiples of SFN cycles. For the purpose of this document an SFN cycle in which a UE may be paged according to its extended paging DRX cycle may be denoted as a paging SFN cycle. It may further be assumed that within a paging SFN cycle, the frame(s) and subframe(s) in which to page the UE will be derived from one or more system information parameter(s), which may be different in different cells, i.e. similar to the current paging DRX scheme. Furthermore, it is very likely that the maximum value of T (and thus also the maximum values of the defaultPagingCycle IE and a possible pre-configured UE-specific DRX cycle length) will be increased from 256 to 1024 radio frames, i.e. to 10.24 seconds, and/or that one or more other paging configuration parameter(s) and another algorithm for calculating paging occasions will be standardized for extended paging DRX cycles.

This should preferably result in that only a single paging occasion occurs during the paging SFN cycle, i.e. one paging occasion every Nth SFN cycle, when extended paging DRX spanning multiple (i.e. N) SFN cycles is used. As a side note, when used in conjunction with extended paging DRX cycles spanning multiple SFN cycles, the interpretation of the defaultPagingCycle IE and a possible pre-configured UE-specific DRX cycle length have to be changed, and possibly renamed, from indicating the length of the actual extended paging DRX cycle to being parameters that are used when deriving the frame(s) within a paging SFN cycle in which the UE may be paged (and indicating the paging DRX cycle to use within the paging SFN cycle in case a scheme allowing paging a UE in multiple frames within the same paging SFN cycle is used).

As can be understood from the above, a general problem with the paging procedure is that it is inherently inefficient in terms of resource usage, since it wastes redundant downlink transmission resources for paging indications and Paging RRC messages (and also PAGING S1AP messages) in cells where the target UE is not listening.

Redundant paging-related radio transmissions, i.e. paging indications on the PDCCH as well as Paging RRC messages, also have other disadvantages than wasting resources. One such disadvantage is that they increase both inter-cell and intra-cell interference. Another disadvantage is that UEs that are not actually targeted by the page have to receive redundant Paging RRC messages, thus wasting resources, e.g. in the form of battery drainage, in the UEs as well. Yet another disadvantage is that the redundant radio transmissions will waste energy, thus keeping the energy consumption of the network unnecessarily high.

Certain attempts have been made by proposing various staged/phased paging schemes, wherein the paging of a UE is divided into two or more stages or phases. The UE is first paged in a certain part of its registration area (i.e. a subarea), and only if no response from the UE is received in this first step, will the UE be paged in the remainder of its registration area. This may possibly be divided into further stages or phases with different paging areas (distinct or overlapping) used for each stage or phase. The choice of subarea(s) to page the UE in and the order in which to use the subarea(s) are based on additional information in the form of location knowledge and/or historical data, such as the UE's latest known cell, possibly combined with knowledge about movement direction and/or speed, or historical statistics of the UE's (or the user's) most commonly visited cell(s).

While such staged/phased schemes may reduce the redundant paging-related radio transmissions and the negative effects thereof, it will introduce significant additional delay when the UE does not respond to the paging attempt in the first subarea. The more stages/phases and subareas the scheme uses, the less time-efficient will the procedure become, since each stage/phase adds the delay of having to wait for the conclusion that no response will be received in the previous stage/phase. A considerable part of the delay is caused by the paging DRX, which contributes with up to 2.56 seconds in each paging stage/phase with the currently specified longest paging DRX cycle. With extended paging DRX cycles the delay contribution will be greatly magnified.

Also, staged/phased paging schemes require network resources to provide, collect or analyze the additional information referred to above.

There is thus a need for improvements of the paging control in known telecommunications systems.

SUMMARY

It is accordingly an object to eliminate or alleviate one or more of the problems referred to above.

After inventive and insightful reasoning, the present inventors have made a number of understandings. One such understanding is that the paging control can be improved by remedying the general lack of synchronization (in terms of for instance SFN) between different cells, particularly in systems using extended paging DRX cycles.

Another understanding is that the resource waste and increased interference, caused by redundant paging requests from base stations attempting to page a device which is not available at those base stations, can be reduced without any time delay penalty by an improved selective control of the paging control messages from the controlling network node to the base stations.

Still another understanding is that the improved selective control of the paging control messages from the controlling network node to the base stations may be based on detection of a paging response made by the paged device via one of the base stations. Yet another understanding is that, beneficially, this improved selective control of the paging control messages may additionally be based on estimations of the respective next paging occasions for the device at the different base stations involved.

One aspect of the present disclosure therefore is a paging control method in a telecommunications system where devices are paged by paging requests from base stations, and the base stations are controlled by paging control messages from a network node. The method according to this aspect is performed in the network node and comprises:

detecting a need to initiate paging of a device;

determining a set of candidate base stations in an area of said telecommunications system, the candidate base stations being potentially capable of reaching said device in said area by sending paging requests at respective paging occasions; and selectively controlling paging control messages intended for said set of candidate base stations depending on detection of a paging response made by the device via one of the base stations in said set of candidate base stations, so as to prevent paging requests from base stations, in said set of candidate base stations, which have not yet sent any paging requests to said device.

The method may, for instance, be implemented in a telecommunications system which is Evolved Packet System/Long Term Evolution (EPS/LTE) compliant, wherein the network node which performs the method is a Mobility Management Entity (MME) and the base stations are E-UTRAN Node B:s (eNBs). In such embodiments, the set of candidate base stations may typically belong to a registration area for said device, wherein the registration area may consist of one or more tracking areas (TA:s). Alternatively, the set of candidate base stations may belong to a subarea of the registration area, such as a single tracking area thereof.

However, the method may equally well be implemented in other network nodes and in other kinds of telecommunications system, including but not limited to a UMTS compliant system.

According to one advantageous approach, the network node selectively controls paging control messages intended for said set of candidate base stations by:

a) for each base station in the set of candidate base stations, estimating the next paging occasion for the device at that base station;

b) sending the paging control messages to the candidate base stations at respective times being coordinated with the respective estimated paging occasions, starting with the base station having the earliest estimated paging occasion;

c) monitoring whether a paging response has been made by the device via one of said base stations; and, if so:

d) refraining from sending paging control messages to every candidate base station for which the sending of the paging control messages in step b) has not yet taken place.

Hence, in this advantageous approach, the network node (e.g. MME) will not send the paging control message (e.g. PAGING S1AP message) to a base station (e.g. eNB) until close before the next paging occasion for the concerned device (e.g. UE) in a cell controlled by the base station. As soon as the device responds to the page, the network node cancels the paging control messages remaining to be sent to base stations in the set of candidate base stations to which paging control messages have not yet been sent. This results in a multi-step paging, which saves signaling (radio) resources, but does not increase the delay of the paging procedure. It saves transmission resources, since the device typically responds to the paging request before the last paging control message has been sent from the network node. It avoids introducing additional delay, because even though the paging control messages are delayed in the network node, the triggered paging requests by the base stations (e.g. the paging indications and the Paging RRC messages) in the cells are not delayed.

Thus, in this advantageous approach, the term "coordinated" in said step b) means that a paging control message intended for a certain base station is sent by the network node at a certain (short) timing advancement prior to the estimated paging occasion for the device at that base station.

For the purpose of accurately estimating the next paging occasion in said step a), the method in the network node may receive, from a certain base station in the system, information allowing synchronization of the network node with the certain base station. The information may be received at least upon establishment of a communication interface between the base station and the network node, and it may moreover be updated repeatedly by way of communication between the base station and the network node. The Detailed Description section will give several examples of how this may be achieved.

The information, which allows synchronization of the network node with the base station for the purpose of accurately estimating the next paging occasion, may for instance comprise one of the following:

a system frame number (SFN) value of the base station;

a subframe number value of the base station;

more than one system frame number (SFN) value, wherein each system frame number (SFN) value pertains to a different cell served by the base station; and more than one system frame number (SFN) value and more than one subframe number value, wherein each system frame number (SFN) value and each subframe number value pertain to a different cell served by the base station.

Additionally, the information may further comprise cell-specific paging control parameters (such as defaultPagingCycle, nB in an EPS/LTE compliant implementation). Also, the information may further comprise a setting value of the timing advancement at which the network node shall send the paging control message to the base station prior to the estimated paging occasion for the device.

The need to initiate paging of the device may be detected by receiving a message from a core network node in the telecommunications system, wherein said message indicates the existence at said core network node of downlink data being addressed to said device. In an EPS/LTE compliant implementation, such a message may be a Downlink Data Notification GTPv2-C message.

The set of candidate base stations potentially capable of reaching said device with a paging request may be determined by:

determining an identifier (e.g. IMSI) of the device;

retrieving a list of tracking area identifiers (e.g. TAI) for the device; and including in said set of candidate base stations every base station having a cell which belongs to a tracking area (e.g. TA) represented in said list.

As an alternative to the advantageous approach referred to above, the network node may instead selectively control paging control messages intended for said set of candidate base stations by:

a') sending the paging control messages to all of the candidate base stations at essentially the same time after having detected the need to initiate paging of said device;

b') monitoring whether a paging response has been made by the device via one of said candidate base stations; and, if so:

c') selectively sending paging cancellation messages to one or more of said candidate base stations.

Hence, according to this alternative approach, the network node (e.g. MME) does not buffer or withhold the paging control messages (e.g. PAGING S1AP) until shortly before the respective estimated paging occasions, but instead sends paging cancellation messages to cancel paging requests that are still pending (not yet sent to the device) in certain base stations (e.g. eNBs) when a response from the paged device (e.g. UE) is received.

For this alternative approach, the network node may include in each paging cancellation message a reference to the paging control message to which it pertains. This will allow the base station to correctly identify which previously received paging control message to disregard from, thereby allowing the base station to terminate a pending page before the paging request is sent by the base station.

In a first variant of the alternative approach, step c') further involves:

for at least some of the base stations in the set of candidate base stations, estimating the respective next paging occasion for the device at each respective base station; and sending paging cancellation messages to such base stations which, according to the estimated next paging occasions, have not yet sent paging requests for said device.

In a second variant of the alternative approach, step c') further involves sending paging cancellation messages to all of said candidate base stations except for the base station which was found in said step b') to have forwarded a paging response from the device.

A second aspect of the present disclosure is a computer readable storage medium encoded with instructions which, when loaded and executed by a processor, cause performance of the method according to the first aspect.

A third aspect of the present disclosure is a network node for controlling a plurality of base stations in a telecommunications system, the network node being configured to send paging control messages to the base stations so as to cause the base stations to send paging requests to devices in the system. The network node comprises:

a memory for storing instructions and data;

an interface for communicating with said base stations; and a processing unit, wherein the processing unit is configured for:

detecting a need to initiate paging of a device;

determining a set of candidate base stations in an area of said telecommunications system, the candidate base stations being potentially capable of reaching said device in said area by sending paging requests at respective paging occasions; and selectively controlling paging control messages intended for said set of candidate base stations depending on detection of a paging response given by the device via one of the base stations in said set of candidate base stations, so as to prevent paging requests from base stations, in said set of candidate base stations, which have not yet sent any paging requests to said device.

The processing unit in the network node according to the third aspect may additionally be configured to perform any or all of the functionality defined above for the advantageous and alternative approaches.

An advantage obtained with the aspects referred to above is a reduction in the waste of signaling resources associated with the paging procedure, without increasing the delay of the paging procedure.

In addition, by reducing the number of transmitted paging-related messages in the cells, the inter-cell and intra-cell interference is reduced.

A further advantage of reducing the number of paging-related messages is a corresponding reduction in the number of redundant paging requests messages that UEs, which are not actually targeted by the paging attempt, have to receive.

Yet another advantage is that the overall energy consumption of the cellular network and its relevant elements is reduced.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated. It should be emphasized that the term "comprises/comprising" when used in this specification is taken to specify the presence of stated features, integers, steps, or components, but does not preclude the presence or addition of one or more other features, integers, steps, components, or groups thereof

BRIEF DESCRIPTION OF THE DRAWINGS

Embodiments will be described in further detail below with reference to the accompanying drawings.

DETAILED DESCRIPTION

Figure 1:
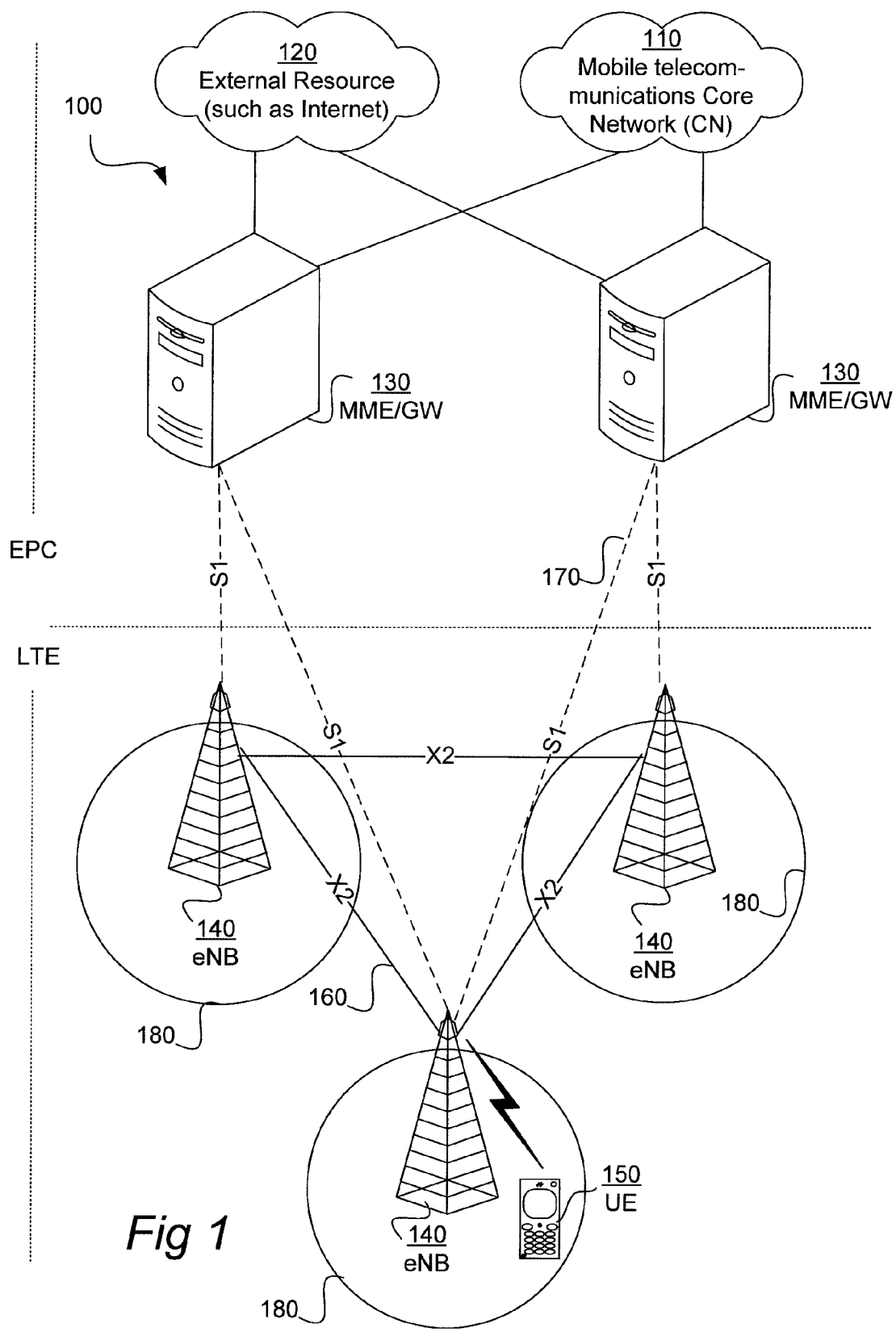
FIG. 1 is a schematic illustration of a non-limiting example of an EPS/LTE compliant telecommunications system in which embodiments of the present disclosure may take part.

Embodiments of the present disclosure will now be described with reference to the accompanying drawings. The inventive aspects may, however, be embodied in many different forms and should not be construed as limited to the embodiments set forth herein; rather, these embodiments are provided so that this disclosure will be thorough and complete, and will fully convey the scope of the inventive aspects to those skilled in the art. The terminology used in the detailed description of the particular embodiments illustrated in the accompanying drawings is not intended to be limiting of the inventive aspects. In the drawings, like numbers refer to like elements.

FIG. 1 shows a schematic view of the general structure of a telecommunications system 100 in which embodiments of the present disclosure may take part. The telecommunications system 100 is an Evolved Packet System/Long Term Evolution (EPS/LTE) compliant system which comprises at least one network node 130, such as a Mobility Management Entity (MME) and/or a Gateway (GW). In FIG. 1, two such network nodes 130 are shown. The network nodes 130 are configured to communicate with other elements of a mobile telecommunications core network (CN) 110 and/or an external resource 120 such as the Internet. The network nodes 130 are configured to communicate with other devices using a packet switched technology or protocol, thereby forming an Evolved Packet Core (EPC) layer.

The network nodes 130 are also configured to communicate with base stations 140 in a radio access network. In FIG. 1, each base station 140 is an Evolved Node B (eNB). The communication between a network node 130 and a base station 140 is effected through a standard or protocol 170, also referred to as S1AP (S1 Application Protocol), wherein S1 denotes the interface (or reference point) between the Radio Access Network and the Core Network in EPS/LTE, e.g. the interface between an eNB and an MME (in which case this part of the S1 interface also may be denoted S1MME). Communication between the base stations 140 is effected through a standard or protocol 160, also referred to as X2, where proprietary messages can be added or, alternatively, the standard be extended, as appropriate for an actual implementation of the system 100. Each base station 140 is further configured to handle or service at least one cell 180. The base stations 140 form an LTE layer or an LTE Advanced layer.

Each base station 140 is configured to communicate with a number of wireless devices present within its cell 180 through a wireless radio frequency protocol. In FIG. 1, only one such device is shown in the form of a UE 150.

In FIG. 1, the cells 180 are shown as non-overlapping. However, in reality the cells will typically be overlapping to some extent, in order to permit smooth handover between cells as the UE 150 is moving. Also, in FIG. 1, the cells 180 are shown as having a modest coverage. However, in reality, when the base station 140 is a macro base station, such a macro cell 180 may have a radius of up to and around 100 km. When the base station 140 is a low-power base station, such a low-power (micro, pico, femto) cell may have a radius in the order of 10-100 m.

Figure 2:
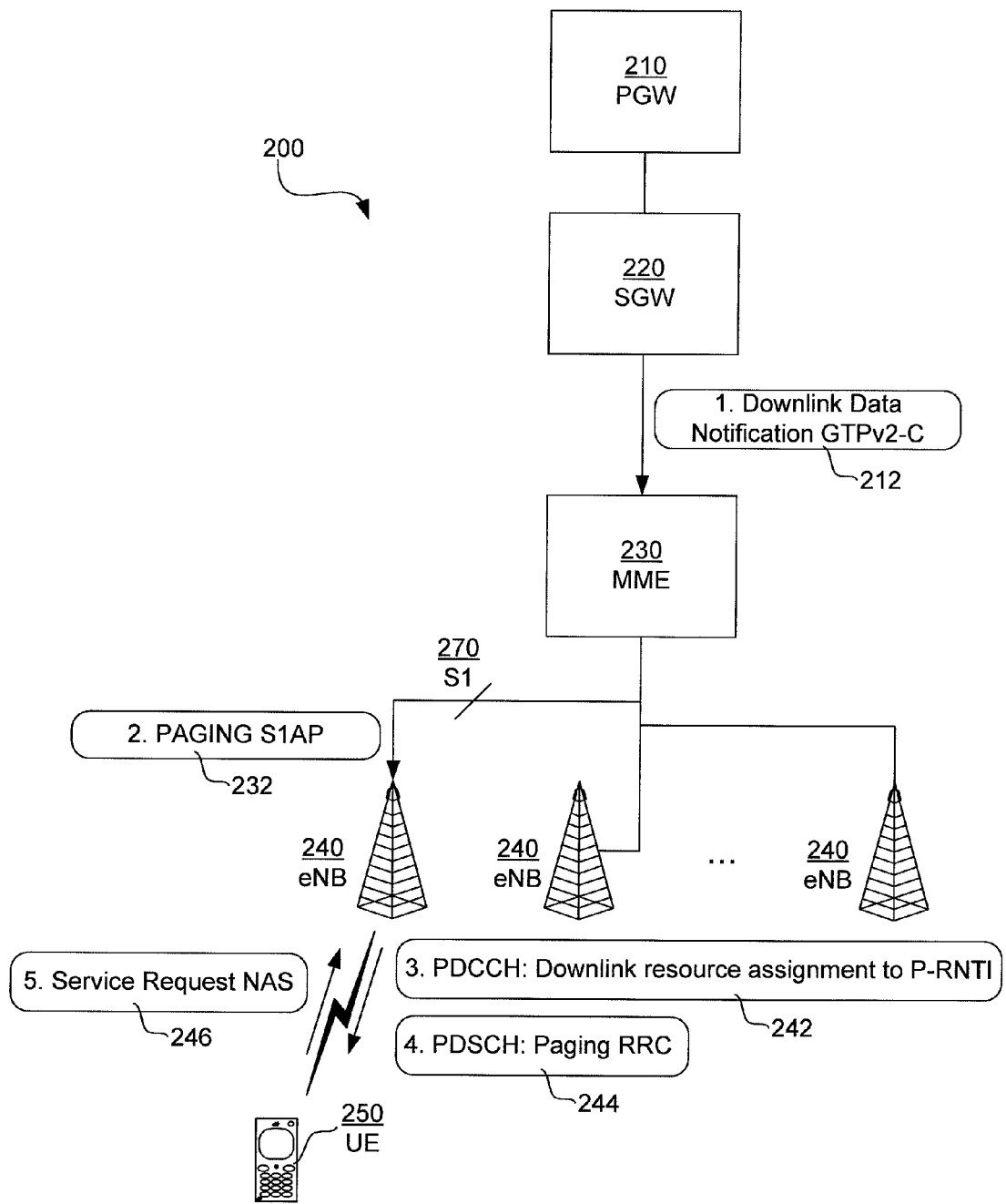
FIG. 2 gives a schematic overview of the different steps performed when a UE is paged in the EPS/LTE system of FIG. 1.

The paging procedure illustrated in FIG. 2 has already been described in a previous section of this document and can be performed in, for instance, the system 100 of FIG. 1. Hence, reference numerals having the last two digits in common between FIGS. 1 and 2 represent elements which can (but do not necessarily have to) be identical.

Figure 3:
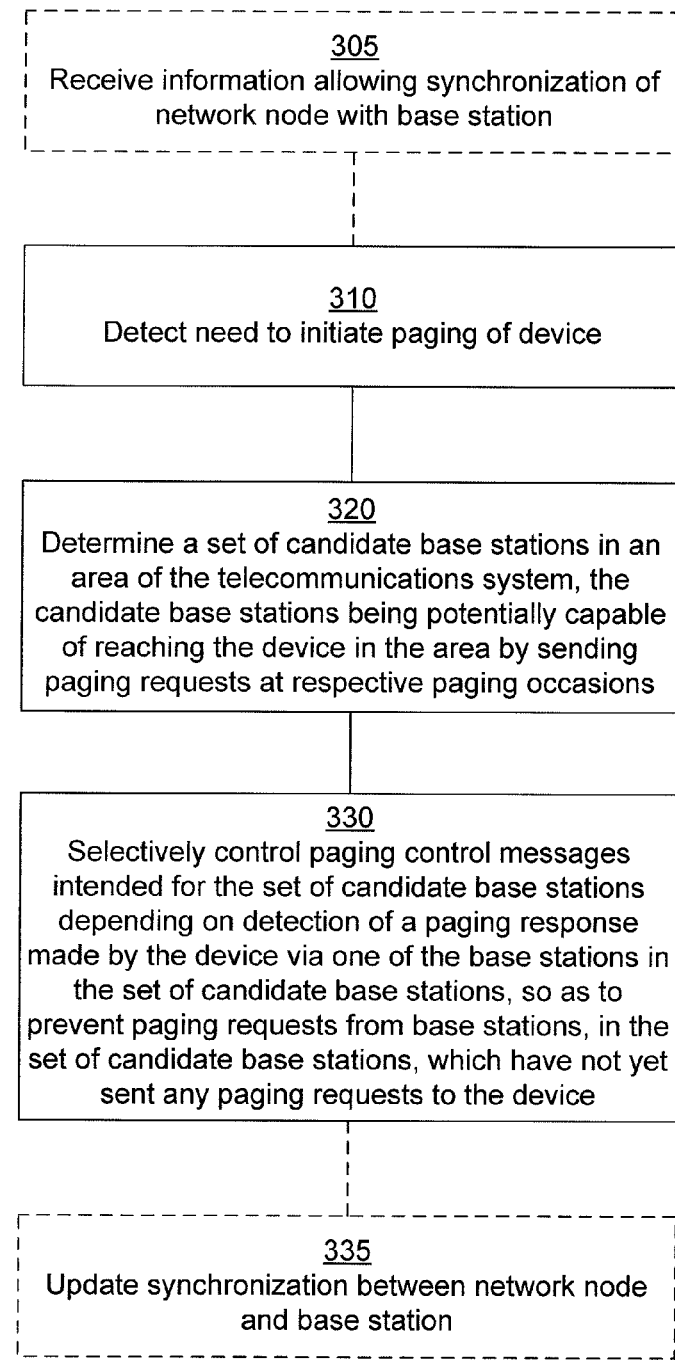
FIG. 3 is a schematic flowchart diagram to illustrate improved paging control according to a method pursuant to the inventive concept.

Reference is now made to FIG. 3, where mandatory steps are shown in solid lines and optional (albeit preferred) steps are shown in dashed lines. Simultaneously, reference will be made to the paging procedure shown in FIG. 2 whenever appropriate. The steps of the method may be performed in the MME 230 of FIG. 2.

An initial optional step 305 will be described later, in the context where it is relevant.

In step 310, the MME 230 detects a need to initiate paging of the UE 250. More specifically, this involves detecting the Downlink Data Notification GTPv2-C message 212 as sent from the SGW 220 to the MME 230, typically triggered by the arrival of downlink user data from/through the PGW 210 in the SGW 220.

Triggered by the Downlink Data Notification GTPv2-C message 212 from the SGW 220, the MME 230 determines in step 320 a set of candidate eNBs 240 in an area of the telecommunications system 200. The area may typically be the registration area for the UE 250, consisting of one or more tracking areas (TA:s). Hence, the set of candidate eNBs 240 is determined as the eNBs 240 which are potentially capable of reaching the UE 250 in the area in question by sending paging requests (i.e. Paging RRC messages 244 on the PDSCH, as indicated by P-RNTI:s 242 on the PDCCH) at respective paging occasions. Step 320 therefore involves the MME 230 checking which eNBs 240 have cells 180 belonging to any of the TAs whose TAIs are included in the UE's current list of TAIs (i.e. the TAs that constitute the entire paging area).

In step 330, the MME 230 performs improved handling of paging control messages 232 (i.e. PAGING S1AP messages) pursuant to the inventive concept. The MME 230 selectively controls the paging control messages 232 intended for the set of candidate base stations depending on detection of a paging response 246 (i.e. Service Request NAS message) made by the UE 250 via one of the eNBs 240 in the set of candidate eNBs 240. This is done in a way so that those eNBs, in the set of candidate eNBs, which have not yet sent any paging requests to the UE 250, are prevented from sending such paging requests. Different embodiments of this step 330 will now be described with reference first to FIG. 4A and then to FIG. 4B.

Figure 4A:
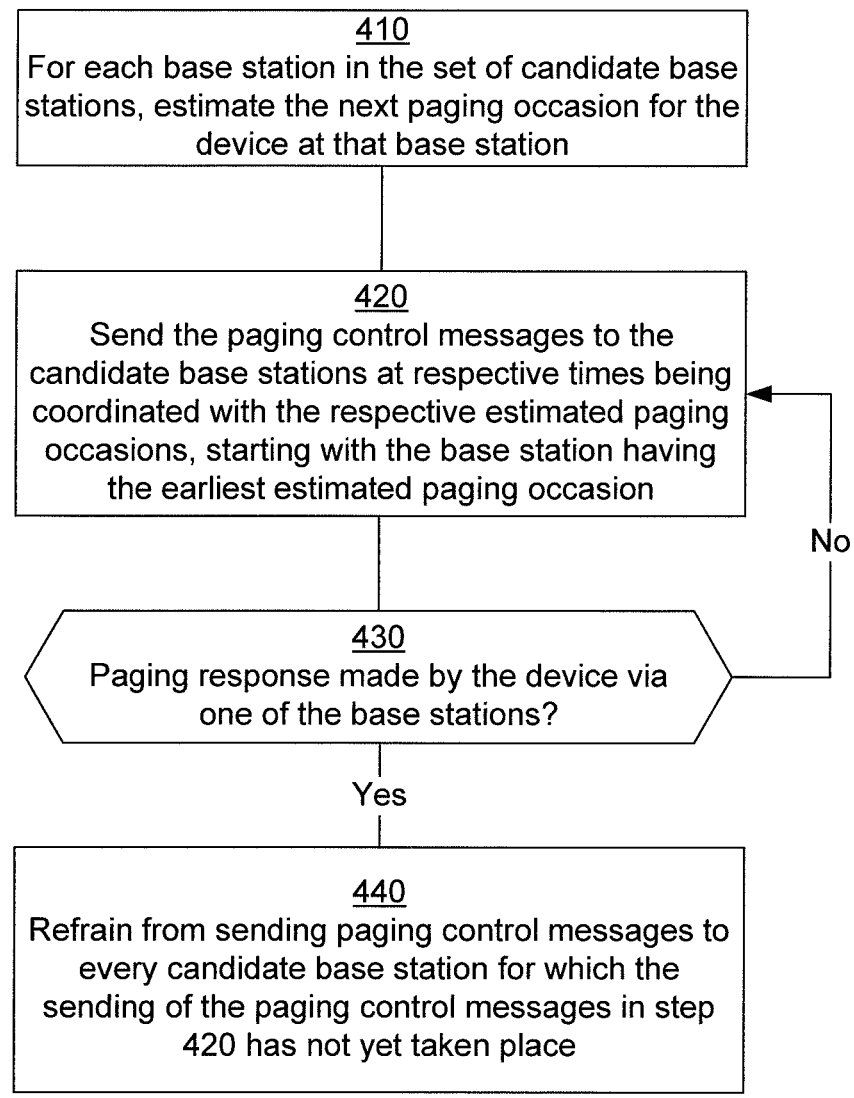
FIG. 4A is a schematic flowchart diagram illustrating in more detail one embodiment of the method shown in FIG. 3.

The embodiment shown in FIG. 4A implements the "advantageous approach" as referred to in the Summary section of this document. Thus, in step 410, the MME 230 estimates, for each eNB in the set of candidate eNBs 240, the next paging occasion for the UE 250 at that eNB.

The MME 230 then sends, in step 420, the paging control messages PAGING S1AP 232 to the candidate eNBs 240 at respective times being coordinated with the respective estimated paging occasions, starting with the eNB having the earliest estimated paging occasion. Thus, the MME 230 in effect buffers the PAGING S1AP messages 232 and delays the sending of each message 232 until shortly before the estimated paging occasion for the UE 250 at the respective eNB 240. The timing advancement for sending the paging control message 232 prior to the estimated paging occasion could be set to an appropriate value such as, for instance, 10 ms (or 5 ms or 100 ms). This time margin to the paging occasion should be adapted to the message transfer delay and the required processing time in the eNB 240, so that the eNB 240 has enough time to process the paging control message PAGING S1AP 232 and to prepare the paging request (paging indication 242 and Paging RRC message 244) before the paging occasion.

In step 430 the MME 230 monitors whether a paging response Service Request NAS 246 has been made by the UE 250 via one of the eNBs 240. Meanwhile, not yet sent paging control messages PAGING S1AP 232 are pending in the MME 230. Subsequent paging control messages PAGING S1AP 232 to respective ones of the candidate eNBs 240 are sent shortly before the respective estimated paging occasion, just like the first paging control message PAGING S1AP 232 to the eNB 240 which had the earliest estimated paging occasion.

When a paging response is found to have been made in step 430, the MME 230 refrains in step 440 from sending the paging control messages PAGING S1AP 232 which are still pending as not yet sent in the MME 230. Thus, in effect, the pending paging control messages PAGING S1AP 232 which have not yet been sent to the eNBs 240 are cancelled by the MME 230, thereby saving signaling (radio) transmission resources in the network.

When the paging control messages PAGING S1AP 232 have been sent to all candidate eNBs 240 (i.e. if no paging response has been detected in step 430), the execution of the method in FIG. 4A is terminated. In such a case, the net result will be that the UE 250 was paged in each cell at exactly the same occasion as it would have been without the modified paging procedure (i.e. no delay is added and no additional resources are consumed).

Note that with extended paging DRX cycles the paging occasions between unsynchronized cells may be significantly distributed in time, e.g. up to a full SFN cycle (i.e. 10.24 seconds), thus leaving plenty of time for the UE 250 to respond between two unsynchronized paging occasions. Even with the currently allowed paging DRX cycles, i.e. ranging from 0.32 to 2.56 seconds, there will often be ample time for the UE 250 to respond.

Hence, with the embodiment shown in FIG. 4A, the paging procedure described with reference to FIG. 2 in the Background section of this document is modified. Note, however, that although the behavior of the MME 230 is modified, the paging messages are the still the same. This means that no standard modifications are needed for the actual paging procedure, except for the transfer of synchronisation information like the SFN and paging control parameters (see description below), which may call for a standard change unless made a proprietary protocol extension.

To enable the improved paging procedure according to FIG. 4A, the MME 230 should preferably be aware of the SFN (and ideally, but not necessarily, also the subframe number) in each cell 180 of the eNBs 240, i.e. typically one SFN (and possibly subframe number) per eNB since the cells belonging to the same eNB are easily synchronized (or possibly one per MBSFN (Multicast-Broadcast Single Frequency Network) area). To this end, the eNBs 240 may inform the MME 230 of their respective SFNs (and possibly subframe numbers), and the eNBs 240 and the MME 230 may subsequently maintain a reasonable synchronization of their internal clocks. The initial notification of the SFN (and possibly subframe number) should preferably be performed when the S1 interface 270 is established (or reset), i.e. typically in conjunction with eNB installation or restart.

Hence, in the aforementioned initial optional step 305 shown in FIG. 3, the MME 230 may receive such information which allows synchronization of the MME 230 with the eNB 240 for the purpose of accurately estimating the next paging occasion information for that eNB in the aforementioned step 410 of FIG. 4A.

Moreover, as seen in an optional step 335 of FIG. 3, an eNB 240 may repeatedly inform the MME 230 of its SFN (and possibly subframe number) to ensure that the MME 230 has a correct perception of the SFN (and possibly subframe number) that is actually used. If the clock synchronization is loose, the eNB 230 may adapt the frequency of such updates of the SFN (and possibly subframe number) information to the clock synchronization accuracy, so that the SFN (and possibly subframe number) is updated/refreshed in the MME 230 before the clocks drift too much.

Clock synchronization between an eNB 240 and an MME 230 may be maintained in various ways. They may exchange clock information (e.g. timestamps) in S1AP messages, or they may rely on built-in synchronization signals in the underlying transmission system (e.g. the transport network). Another option is to use the Network Time Protocol (NTP) which is commonly used to synchronize nodes in an IP based network.

In addition to the SFN (and possibly subframe number) in each cell 180, the MME 230 should be aware of the cell-specific paging control parameters which define the location of paging occasions within an SFN cycle, e.g. the defaultPagingCycle and nB parameters (and the values of IMSI modulo 1024 and a possible UE-specific paging DRX cycle which are inherently known in the MME 230) and/or possible other parameters introduced to support extended paging DRX cycles.

Moreover, a setting value for the timing advancement for sending the paging control message 232 prior to the estimated paging occasion may also be communicated from the eNB 240 to the MME 230 in a similar way (e.g. steps 305 and 335 in FIG. 3).

The SFN (and possibly subframe number) and the cell-specific paging control parameters may be conveyed from the eNB 240 to the MME 230 when the eNB 240 is installed (or restarted), see step 305 in FIG. 3. If the information differs between different cells of the eNB 240, the eNB 240 should indicate which TAI(s) (i.e. PLMN ID plus Tracking Area Code(s)) each set of parameters is associated with. The defaultPagingCycle and the TAI(s) of the supported Tracking Area(s) is/are already pursuant to the current specifications transferred from the eNB 240 to the MME 230 when the S1 interface is established, i.e. in the S1 SETUP REQUEST S1AP message (see reference [2] in the Background section of this document). Potential, suitable S1AP messages for conveying the other parameters (and, if needed, their associations to TAIs) include the S1 SETUP REQUEST message (preferred for the initial information transfer), the RESET message and the ENB CONFIGURATION UPDATE message. Introducing a new S1AP message for this purpose is also an option.

To ensure that the MME 230 has a (reasonably) correct SFN (and possibly subframe number), when repeated SFN (and possibly subframe number) updates are desired (step 335 in FIG. 3), a suitable S1AP message could be the ENB CONFIGURATION UPDATE message (or a new S1AP message). Alternatively, the eNB 240 could include the SFN in any S1AP message that is anyway being sent to the MME 230. The latter would be a way of opportunistically utilizing existing signaling to piggyback SFN information updates at suitable intervals.

Figure 4B:
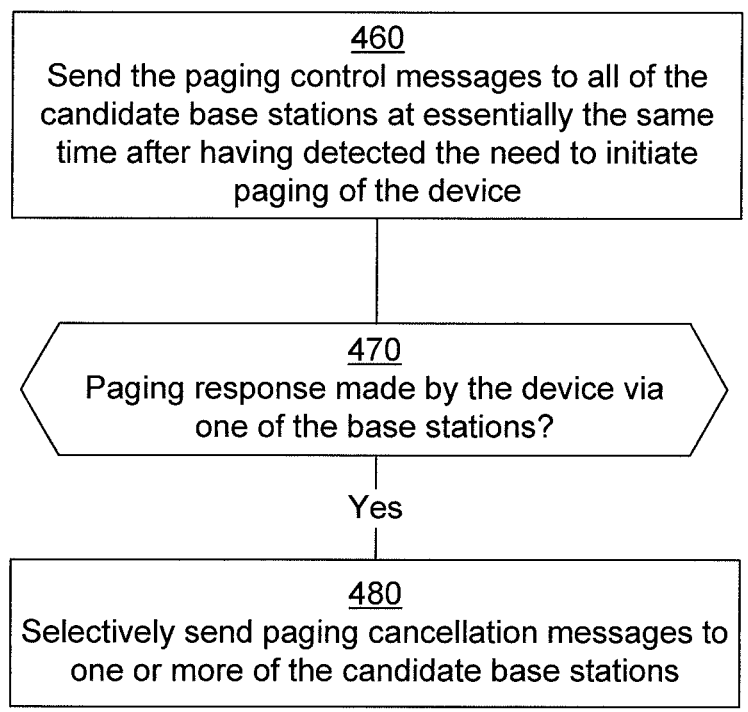
FIG. 4B is a schematic flowchart diagram which illustrates another embodiment of the method shown in FIG. 3.

The embodiment shown in FIG. 4B implements the "alternative approach" as referred to in the Summary section of this document. Unlike the embodiment in FIG. 4A, in step 460 of the FIG. 4B embodiment the MME 230 sends paging control messages PAGING S1AP 232 to all candidate eNBs 240 immediately, i.e. at essentially the same time after having detected the need to initiate paging of the UE 250 (step 310 in FIG. 3). In step 470 the MME 230 monitors whether a paging response Service Request NAS 246 has been made by the UE 250 via one of the eNBs 240. When a paging response Service Request NAS 246 by the UE 250 has been found in step 470, the MME 230 selectively sends in step 480 paging cancellation messages to one or more of the candidate eNBs 240 in order to cancel pending pages in the eNBs 240. If no paging response is detected from the UE 250 in step 470 within a certain time (e.g. defined by a predefined threshold time period or triggered by a timeout), the method of FIG. 4B ends without executing step 480.

The paging cancellation message may be a new S1AP message, e.g. a PAGING CANCELLATION S1AP message, or a PAGING S1AP message with a flag indicating that the page is cancelled. The paging cancellation message will include some kind of indication of which page that is to be cancelled, i.e. some kind of reference which is included in both the original PAGING S1AP message and the message used to cancel the page. This may be the content of the preceding PAGING S1AP message, or a hash or Cyclic Redundancy Check (CRC) value derived from the content of the preceding PAGING S1AP message, or only the UE Paging Identity (i.e. the S-TMSI or IMSI) or simply a paging procedure identifier, e.g. a transaction identifier. If the UE Paging Identity, a paging procedure identifier or transaction identifier is used as page reference, then neither the flag nor the content of the preceding PAGING S1AP message (except the page reference) needs to be included; a PAGING S1AP (or PAGING CANCELLATION S1AP) message containing only the page reference, i.e. the UE Paging Identity, the paging procedure identifier or transaction identifier in itself, indicates "cancellation".

Two variants of the embodiment shown in FIG. 4B will be described below.

The first variant uses selective paging cancellation messaging based on paging occasion knowledge in the MME 230. With this variant the MME 230 is thus aware of the paging occasions in the eNBs 240, for instance because it has received SFN (and possibly subframe number) and paging control parameters from the eNBs (and maintains a reasonable synchronization) like in the FIG. 4A embodiment previously described. When receiving a Downlink Data Notification GTPv2-C message 212 from the SGW 220, the MME 230 initially follows the regular procedure, i.e. it checks with the concerned UE's current TAI list which eNBs 240 should take part in the paging and sends paging control messages PAGING S1AP 232 to these eNBs 240.

When a paging response is detected from the UE 250, the MME 230 consults its knowledge of the SFN cycles (and possibly subframe numbers) of (the cells of) the eNBs 240 to check which eNBs 240 are still waiting to send one or more paging requests (paging indication(s) 242 and Paging RRC message(s) 244), and sends a paging cancellation message to each of these eNBs 240. When receiving paging cancellation messages, the eNBs will cancel the pending paging indications 242 and Paging RRC messages 244. If no eNBs 240 are found to be still waiting to send paging requests, no paging cancellation messages are sent.

The second variant of the embodiment shown in FIG. 4B uses non-selective paging cancellation messaging without paging occasion knowledge in the MME 230. With this variant, the MME 230 is aware of neither the SFN cycles (and possibly subframe numbers) nor the paging control parameters of (the cells of) the eNBs 240. When a paging is triggered, the MME 230 determines which eNBs 240 are affected and immediately sends paging control messages PAGING S1AP 232 to all these eNBs 240. When a paging response 246 is received from the UE 250, the MME 230 sends a paging cancellation message to all eNBs that received PAGING S1AP messages, except the one that the UE paging response 246 was received from. An exception to the exclusion of the eNB 240 that the UE paging response 246 was received from could be made if the MME 230 knows that this eNB 240 serves cells with unsynchronized SFNs, in which case the MME 230 may send a paging cancellation message to this eNB 240 too in order to cancel potentially pending pages in other cells of the eNB 240 than the one the UE 250 is located in. The knowledge of whether the eNB 240 serves cells with unsynchronized SFNs may be configured in the MME 230, or the MME 230 may have received it from the eNB 240, e.g. in the S1 SETUP REQUEST S1AP message when the S1 interface was established. Each eNB 240 that receives a paging cancellation message and has one or more pending paging requests (paging indication(s) 242 and Paging RRC message(s) 244) matching the page reference in the paging cancellation message will cancel the pending paging requests. Hence, in this variant, the MME 230 does not have to keep track of the SFN cycles (and possibly subframe numbers) and paging control parameters of (the cells of) the eNBs 240.

Figure 5:
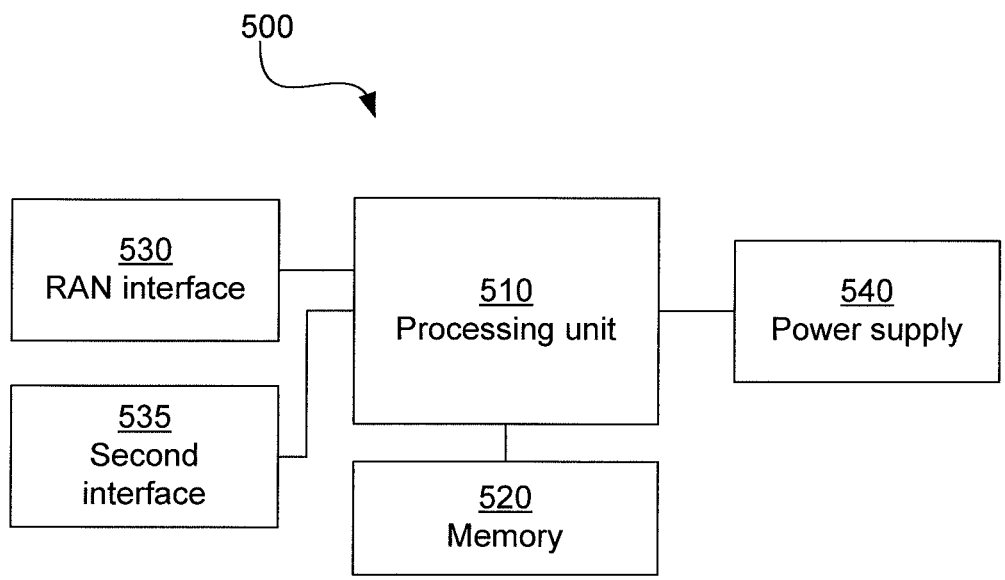
FIG. 5 is a schematic block diagram of a network node according to one embodiment.

FIG. 5 shows a schematic view of the general structure of a network node 500 according to one embodiment herein. The network node 500 may typically be the aforementioned MME 230. In other embodiments/other types of telecommunications systems, the network node 500 may for instance be an SGSN (Serving GPRS Support Node) in the packet-switched domain of UMTS, an MSC/VLR (Mobile Switching Center/Visitor Location Register) in the circuit-switched domain of UMTS, or an RNC (Radio Network Controller) in UMTS.

The network node 500 comprises a processing unit 510. The processing unit 510 may be implemented as at least one CPU (Central Processing Unit), DSP (Digital Signal Processor), FPGA (Field-Programmable Gate Arrays), ASIC (Application Specific Integrated Circuit) or any other electronic programmable logic device, or a combination of any such devices, adapted for executing computer program instructions that may be stored in a memory 520.

The processing unit 510 is configured to read instructions from the memory 520 and execute these instructions to control the operation of the network node 500, including performing the functionality for providing improved paging control as described above in various sections of this document, as well as in FIGS. 3, 4A and 4B.

The memory 520 may be implemented using any commonly known technology for computer-readable memories such as ROM, RAM, SRAM, DRAM, CMOS, FLASH, DDR, SDRAM or some other memory technology. As already mentioned, in the memory 520 there is stored a set of instructions that when executed by the processing unit 510 will serve to control the operation of the network node 500. The instructions may be downloaded into the memory 520 from an external local device, such as the computer readable storage medium 640 described below with reference to FIG. 6, or from a remote device via a network.

The network node 500 further comprises at least one radio access network interface 530. The network node 500 is configured to communicate with base stations in a radio access network using the interface 530, such as the aforementioned eNBs 240 over the S1 interface 170/270. In other embodiments/other types of telecommunications systems, any such base station may for instance be a Node B in UMTS, or a BTS (Base Transceiver Station) or RBS (Radio Base Station) in another cellular network, such as GSM/GPRS or CDMA2000.

The network node 500 further comprises a second interface 535. The network node 500 is configured to communicate with other units in the system 100/200 through the second interface 535, for instance the SGW 220 or other core network nodes such as the PGW 210. The network node 500 also comprises a power supply 540.

Hence, the network node 500 illustrated in FIG. 5 is adapted for controlling the plurality of base stations 140, 240 in the telecommunications system 100. The network node 500 is configured to send paging control messages 232 to the base stations 140, 240, so as to cause the base stations to send paging requests 242, 244 to devices 150, 250 in the system. As mentioned above, the network node 500 comprises a memory 520 for storing instructions and data, an interface 530 for communicating with the base stations, and a processing unit 510. The processing unit 510 is configured for detecting (cf step 310, FIG. 3) a need to initiate paging of a device 150, 250 and determining (cf step 320, FIG. 3) a set of candidate base stations 140, 240 in an area of the telecommunications system, wherein the candidate base stations are potentially capable of reaching the device in aforesaid area by sending paging requests 242, 244 at respective paging occasions. The processing unit 510 is also configured for selectively controlling (cf step 330, FIG. 3) paging control messages 232 intended for the set of candidate base stations depending on detection of a paging response 246 given by the device via one of the base stations in the set of candidate base stations, so as to prevent paging requests from base stations, in the set of candidate base stations, which have not yet sent any paging requests to the device.

Moreover, the processing unit 510 of the network node 500 illustrated in FIG. 5 may be further configured to selectively control the paging control messages 232 to the set of candidate base stations 140, 240 by performing the functionality described above with reference to FIG. 4A, i.e.:

a) for each base station in the set of candidate base stations, estimating (cf step 410, FIG. 4A) the next paging occasion for the device 150, 250 at that base station;

b) sending (cf step 420, FIG. 4A) the paging control messages 232 to the candidate base stations at respective times being coordinated with the respective estimated paging occasions, starting with the base station having the earliest estimated paging occasion;

c) monitoring (cf step 430, FIG. 4A) whether a paging response 246 has been made by the device via one of the base stations; and, if so:

d) refraining (cf step 440, FIG. 4A) from sending paging control messages to every candidate base station for which the sending of the paging control messages in step b) has not yet taken place.

Moreover, the processing unit 510 may be further configured to perform any or all of the additional functionality described above with reference to the embodiments shown in FIGS. 3 and 4A.

Alternatively, the processing unit 510 of the network node 500 illustrated in FIG. 5 may be further configured to selectively control the paging control messages 232 to the set of candidate base stations 140, 240 by performing the functionality described above with reference to FIG. 4B, i.e.:

a') sending (cf step 460, FIG. 4B) the paging control messages 232 to all of the candidate base stations at essentially the same time after having detected the need to initiate paging of the device;

b') monitoring (cf step 470, FIG. 4B) whether a paging response 246 has been made by the device via one of the candidate base stations; and, if so:

c') selectively sending (cf step 480, FIG. 4B) paging cancellation messages to one or more of the candidate base stations.

Moreover, the processing unit 510 may be further configured to perform any or all of the additional functionality described above with reference to the embodiments shown in FIGS. 3 and 4B.

Figure 6:
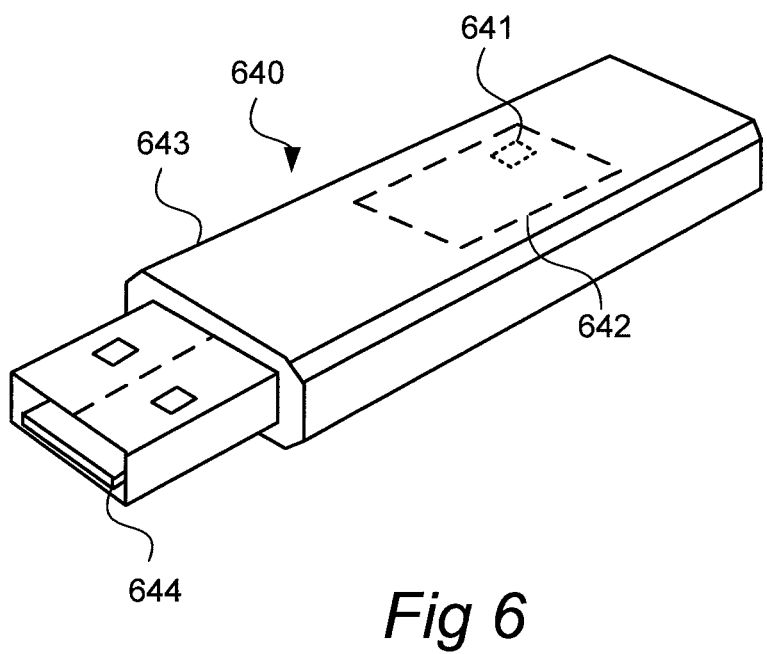
FIG. 6 is a schematic illustration of a computer readable storage medium according to one embodiment.

FIG. 6 shows a schematic view of a computer readable storage medium 640 which may be used to accommodate instructions for performing the inventive functionality disclosed herein. In the embodiment shown in FIG. 6, the computer-readable medium 640 is a memory stick, such as a Universal Serial Bus (USB) stick. The USB stick 640 comprises a housing 643 having an interface, such as a connector 644, and a memory chip 642. The memory chip 642 is a flash memory, i.e. a non-volatile data storage that can be electrically erased and re-programmed. The memory chip 642 is programmed with instructions 641 that when loaded (possibly via the connector 644) into a processor, such as the processing unit 510 of FIG. 5, causes execution of a method or procedure according to the embodiments disclosed above. The USB stick 640 is arranged to be connected to and read by a reading device, such as the network node 500 of FIG. 5 or a separate computer, for loading the instructions into the processor. It should be noted that a computer-readable storage medium can also be other media, such as compact discs, digital video discs, hard drives or other memory technologies commonly used. The instructions can also be downloaded from the computer-readable storage medium via a wireless interface to be loaded into the processor.

The inventive aspects has mainly been described above with reference to a few embodiments. However, as is readily appreciated by a person skilled in the art, other embodiments than the ones disclosed above are equally possible within the scope of the inventive aspects, as defined by the appended patent claims.

For instance, the functionality according to any of the embodiments described above may be combined with a staged/phased paging scheme as referred to in the Background section of this document. In such a case, the inventive functionality may be used within each subarea page (e.g. within a single TA of the registration area or within a dynamically selected set of cells constituting such a subarea).

Moreover, the present inventors envisage optimized distribution of paging occasions, as will now be briefly described. A way to increase the chances that the resource-saving benefits of the embodiments presented above are fully leveraged is to configure the cell parameters such that the paging occasions in different cells of a Tracking Area or a set of Tracking Areas are uniformly distributed in a sufficiently large time period (i.e. with sufficiently large time interval between the paging occasions) to allow the MME 230 to detect a response to a paging request in one of the paging occasions in one cell before it must send the paging control message PAGING S1AP 232 to the next eNB 240 (in the FIG. 4A embodiment), or before the MME 230 has to send a paging cancellation message in order to cancel the pending paging requests at the eNB 240 in the next paging occasion (in the FIG. 4B embodiment). This may be achieved by configuring planned phase shifts between the SFN cycles of the cells and/or by configuring the parameters governing the frame(s) and subframe(s) of the paging occasions within paging SFN cycles, so that the desired paging occasion distribution results. For instance, the cells in one Tracking Area could be configured with uniformly distributed phase shifts of the SFN cycles, while the parameters controlling the paging occasion(s) within a paging SFN cycle (i.e. the frame(s) and subframe(s) of the paging occasions) could be configured to be the same in these cells.

In MBSFN areas, where the SFN cycles have to be coordinated, only the parameters controlling the paging occasions within a paging SFN cycle would be utilized for the paging occasion distribution. These parameters would thus be configured in a planned and well-coordinated manner to achieve the desired paging occasion distribution. Optionally, one may even introduce one or more new parameter(s) for the paging occasion calculation, which is(are) specifically designed for producing easily controlled and predictable paging occasion locations within a paging SFN cycle, even if the IMSI modulo 1024 value and/or some other UE specific parameter(s) is (are) also used as input to the calculation.

As an extreme variant of the paging occasion distribution concept, the paging occasions in different cells may even be distributed to different, even non-overlapping SFN cycles. This extreme variant could be used in cases where the paging is known to be associated with delay-insensitive communication, e.g. determined from service awareness, subscription data, QoS (Quality of Services), or device category/capabilities.

The invention claimed is:

1. A paging control method in a telecommunications system where devices are paged by paging requests from base stations, the base stations being controlled by paging control messages from a network node, the method comprising, in said network node:
    detecting a need to initiate paging of a device;
    determining a set of candidate base stations in an area of said telecommunications system, the candidate base stations being potentially capable of reaching said device in said area by sending paging requests at respective paging occasions; and
    controlling paging of the device from the set of candidate base stations by sending paging control messages to successive ones of the base stations in the set of candidate base stations according to a sequence corresponding to next paging occasions at the base stations, and refraining from sending the paging control messages to any further base stations in the sequence, in response to detecting a paging response from the device, thereby preventing the any further base stations from paging for the device.

2. The method of claim 1, wherein controlling paging of the device comprises:
    a) for each base station in the set of candidate base stations, estimating the next paging occasion for the device at that base station; and
    b) wherein the sending of the paging control messages starts with the base station having the earliest estimated next paging occasion.

3. The method of claim 2, further comprising:
    receiving, from a base station in said telecommunications system, information allowing synchronization of said network node with said base station for the purpose of accurately estimating the next paging occasion in said step a).

4. The method of claim 3, wherein said information is received at least upon establishment of a communication interface between said base station and said network node.

5. The method of claim 3, wherein said information, which allows synchronization of said network node with said base station for the purpose of accurately estimating the next paging occasion information, is updated repeatedly by way of communication between said base station and said network node.

6. The method of claim 3, wherein said information, which allows synchronization of said network node with said base station for the purpose of accurately estimating the next paging occasion information, comprises one of the following:
    a system frame number (SFN) value of the base station;
    a subframe number value of the base station;
    more than one system frame number (SFN) value, wherein each system frame number (SFN) value pertains to a different cell served by the base station; and
    more than one system frame number (SFN) value and more than one subframe number value, wherein each system frame number (SFN) value and each subframe number value pertain to a different cell served by the base station.

7. The method of claim 3, wherein said information, which allows synchronization of said network node with said base station for the purpose of accurately estimating the next paging occasion information, further comprises cell-specific paging control parameters.

8. The method of claim 3, wherein the paging control messages, which are sent, are coordinated with the respective estimated next paging occasions such that a paging control message is sent at a certain timing advancement prior to the estimated next paging occasion.

9. The method of claim 8, wherein said information, which allows synchronization of said network node with said base station for the purpose of accurately estimating the next paging occasion information, further comprises a setting value of said timing advancement.

10. The method of claim 1, wherein detecting the need to initiate paging of said device involves receiving a message from a core network node in the telecommunications system, said message indicating the existence at said core network node of downlink data being addressed to said device.

11. The method of claim 1, wherein determining the set of candidate base stations potentially capable of reaching said device in said area by sending paging requests involves:
   determining an identifier (IMSI) of the device;
   retrieving a list of tracking area identifiers for the device; and
   including in said set of candidate base stations every base station having a cell which belongs to a tracking area (TA) represented in said list.

12. The method of claim 1, wherein said telecommunications system is Evolved Packet System/Long Term Evolution (EPS/LTE) compliant, said network node is a Mobility Management Entity (MME) and said base stations are E-UTRAN Node Bs (eNBs).

13. A non-transitory computer-readable medium storing a computer program comprising program instructions that, when executed by a processor of a network node, configures the network node for paging control in a telecommunications system where devices are paged by paging requests from base stations, the base stations being controlled by paging control messages from the network node, the computer program comprising program instructions configuring the network node to:
   detect a need to initiate paging of a device;
   determine a set of candidate base stations in an area of said telecommunications system, the candidate base stations being potentially capable of reaching said device in said area by sending paging requests at respective paging occasions; and
   control paging of the device from the set of candidate base stations by sending paging control messages to successive ones of the base stations in the set of candidate base stations according to a sequence corresponding to next paging occasions at the base stations, and refraining from sending the paging control messages to any further base stations in the sequence, in response to detecting a paging response from the device, thereby preventing the any further base stations from paging for the device.

14. A network node for controlling a plurality of base stations in a telecommunications system, the network node being configured to send paging control messages to the base stations so as to cause the base stations to send paging requests to devices in the system, wherein said network node comprises:
   a memory for storing instructions and data;
   an interface for communicating with said base stations; and
   processing circuitry configured to:
      detect a need to initiate paging of a device;
      determine a set of candidate base stations in an area of said telecommunications system, the candidate base stations being potentially capable of reaching said device in said area by sending paging requests at respective paging occasions; and
      control paging of the device from the set of candidate base stations by sending paging control messages to successive ones of the base stations in the set of candidate base stations according to a sequence corresponding to next paging occasions at the base stations, and refraining from sending the paging control messages to any further base stations in the sequence, in response to detecting a paging response from the device, thereby preventing the any further base stations from paging for the device.

15. The network node of claim 14, wherein the processing circuitry is configured to control the paging of the device by:
   a) for each base station in the set of candidate base stations, estimating the next paging occasion for the device at that base station; and
   b) wherein the sending of the paging control messages starts with the base station having the earliest estimated next paging occasion.

* * * * *